United States Patent
King et al.

[11] Patent Number: 6,105,488
[45] Date of Patent: Aug. 22, 2000

[54] SUPPORT BRACE FOR PIVOTALLY MOUNTING A FRYER LID ON MONORAIL LIFTING DEVICE

[75] Inventors: James D. King, Kettering; Stephen D. Werts, Eaton, both of Ohio

[73] Assignee: Henny Penny Corporation, Eaton, Ohio

[21] Appl. No.: 09/392,610

[22] Filed: Sep. 9, 1999

Related U.S. Application Data

[62] Division of application No. 09/047,406, Mar. 25, 1998, Pat. No. 5,974,955.

[51] Int. Cl.⁷ .................................................. A47J 37/12
[52] U.S. Cl. .......................... 99/407; 99/336; 220/315; 220/318; 292/257; 210/DIG. 8; 248/351
[58] Field of Search ............................. 99/330, 336, 403, 99/407, 409, 410, 411, 412, 413, 414, 415, 416, 417; 126/369, 391; 210/DIG. 8; 220/315, 318, 329; 292/257, 259 R; 248/351

[56] References Cited

U.S. PATENT DOCUMENTS

| | | |
|---|---|---|
| D. 336,007 | 6/1993 | King et al. . |
| 2,176,869 | 10/1939 | Childs . |
| 2,840,436 | 6/1958 | Mason . |
| 3,701,313 | 10/1972 | Boggs . |
| 3,990,433 | 11/1976 | Keating . |
| 4,602,612 | 7/1986 | Schwizer . |
| 4,848,317 | 7/1989 | Prudhomme et al. . |
| 4,858,119 | 8/1989 | Waugh et al. . |
| 4,913,038 | 4/1990 | Burkett et al. . |
| 4,930,408 | 6/1990 | King et al. . |
| 5,033,368 | 7/1991 | Brewer . |
| 5,038,753 | 8/1991 | Yokoyama et al. . |
| 5,050,582 | 9/1991 | Almond et al. . |
| 5,232,151 | 8/1993 | Mercer et al. . |
| 5,261,322 | 11/1993 | Yokoyama et al. . |
| 5,313,876 | 5/1994 | Hilger et al. . |
| 5,402,712 | 4/1995 | King et al. . |
| 5,402,713 | 4/1995 | King . |
| 5,417,202 | 5/1995 | Cote . |
| 5,540,215 | 7/1996 | Fritzsche et al. . |
| 5,577,438 | 11/1996 | Amitrano et al. . |
| 5,611,330 | 3/1997 | Corliss et al. . |
| 5,617,776 | 4/1997 | King et al. . |
| 5,974,955 | 11/1999 | King et al. . |

OTHER PUBLICATIONS

Henny Penny Pressure Fryer Model PFG–690 Service Manual, (Rev. Jul. 1998).

*Primary Examiner*—Milton Cano
*Attorney, Agent, or Firm*—Baker Botts L.L.P.

[57] ABSTRACT

A supporting brace is employed to pivotally mount a fryer lifting lid on a monorail lifting device. The supporting brace includes a central bracing member having a first and a second member face and having a first and a second member end. A monorail mounting bracket is positioned on the second member face. A first pivot arm extends substantially perpendicular to the first member face at the first member end, and a second pivot arm extends substantially perpendicular to the first member face at the second member end. The first member end has a first member end height, and the second member end has a second member end height. The first pivot arm has a first pivot arm height and the second pivot arm has a second pivot arm height, such that the first member end height is greater than the first pivot arm height and the second member end height is greater than the second pivot arm height. In addition, a first reinforcing arm extends from the first member end and is in contact with the first pivot arm, and a second reinforcing arm extends from the second member end and is in contact with the second pivot arm. Further, a lifting lid assembly includes a lifting lid pivotally mounted on a supporting brace and a monorail lifting device including a monorail having a receiving bracket for receiving the monorail mounting bracket and a drive assembly for raising and lowering the receiving bracket along the monorail.

9 Claims, 8 Drawing Sheets

SUPPORT BRACE FOR PIVOTALLY MOUNTING A FRYER LID ON MONORAIL LIFTING DEVICE

This is a divisional of application Ser. No. 09/047,406 filed Mar. 25, 1998, now U.S. Pat. No. 5,974,955.

BACKGROUND OF THE INVENTION

1. Field of the Invention

The invention relates generally to a supporting brace for pivotally mounting a fryer lifting lid on a monorail lifting device. Further, it relates to a lifting lid assembly including a lifting lid pivotally mounted on a supporting brace and a monorail lifting device including a monorail having a receiving bracket for receiving a monorail mounting bracket positioned on the supporting bracket and manual, automatic, or manually assisted means for raising and lowering the receiving bracket along the monorail.

2. Description of Related Art

A large capacity pressure cooker or pressure fired deep fat fryer generally comprises a vat or cooking vessel of a sufficient size to receive a wire basket or tray carrier, in which the food product to be cooked is held. The basket or tray carrier is thereafter submersed in a cooking medium, such as melted shortening or cooking oil, which is contained in the cooking vessel. The cooking vessel may be closed by a lid which makes a seal with an upper edge of the cooking vessel. Alternatively, a large capacity cooker may be of an open-well design. In such cookers, the lid of the cooker is an open frame permitting direct access to the cooking vessel and to the food products submersed therein. The frame may support a wire basket for holding food products or a food tray carrier for carrying a plurality of trays containing food products. Although the frame does not form an air-tight seal with the upper edge of the cooking vessel, the frame may reduce spillage and splashing of a cooking medium from the cooking vessel during cooking.

In one known configuration, the lid lifting assembly includes a support frame vertically oriented and secured to a rearward end of the pressure cooker. The support frame comprises a pair of vertical guide rails, each having a U-shaped cross-section and opening toward each other. The guide rails are joined together at their upper and lower ends by top and bottom horizontal frame members. The front, rear, sides, and top of the support frame may be enclosed by stainless steel panels forming a lid lifting device housing, which comprises a portion of a cooker cabinet or a cooker transfer cart. A frame-like carriage is mounted vertically within the support frame. The carriage has rollers which are adapted to be received within the support frame guide rails. Consequently, the carriage may be positioned vertically within the support frame. A pair of horizontal arms is affixed to the carriage. The arms extend from the carriage toward the cooker lid through vertical slots in the stainless steel panel covering the front of the support frame. The cooking vessel lid of the pressure cooker is mounted on these horizontal arms.

A cable drum is driven by an electric motor mounted on the top horizontal frame member. In a further known configuration, a pair of cables is provided, each cable having one end attached to the drum and the other end attached to the carriage. One of the cables may be slightly longer than the other and, consequently, does not bear the weight of the carriage. The longer cable serves as a back-up cable if the primary cable fails. The drum is rotatable in a first direction by the electric motor to raise the carriage within the support frame and consequently raising the carriage arms and the lid therewith. The drum is rotatable in the opposite direction by the electric motor to lower the carriage within the support frame and to lower the arms and lid therewith. In this manner the lid of the pressure cooker is shifted between its lowered position seated upon the upper edge of the cooking vessel and its raised position.

In another known configuration, the cooker lid may be manually raised and lowered with the assistance of a counterbalance weight supported in the lid lifting device housing. With the assistance of a locking device, the cooker lid may be manually lifted and supported at various heights. Moreover, the use of a counterbalance weight has been combined with the use of an electrical motor to create a manually assisted raising and lowering means.

In a closed lid cooker, the food product is cooked for the desired length of time under both elevated heat and pressure. Following the cooking cycle, an operator may relieve the pressure in the cooking vessel and then may open the lid in order to remove the wire basket or fryer tray carrier or simply remove the food product from the wire basket or fryer tray carrier.

Because the lid must be of sufficiently heavy construction to properly and safely withstand the pressure within the cooking vessel during the cooking cycle, it may be difficult for some operators to lift the lid to load or unload the cooker, or remove the wire basket or fryer tray carrier. To overcome this problem, operators have employed various types of automatic mechanisms for opening and closing the cooker lid. In some instances, these various mechanisms are used to additionally hold the lid down and in a sealed position during the pressurized operation of the cooker.

Some known lid raising and lowering mechanisms require powerful power train means. Moreover, some of these mechanisms are positioned at the sides of or around the cooking vessel making access to the cooking vessel for loading and unloading and for cleaning difficult or awkward, or both. Electro-mechanical or hydraulic systems have been used for opening and closing the lid, but these systems have experienced significant maintenance problems and resultant down-time. In addition, some of the raising and lowering means are sufficiently complex to require a skilled operator. As a result, efforts to mechanize the operation of large capacity pressure cookers by means of electro-mechanical or hydraulic controls for raising and lowering the lids of the cooking vessels have sometimes produced more problems than they have solved. In addition, the more complex and the more exposed the raising and lowering mechanism, the more susceptible the mechanism is to the adverse effects of dust, dirt, and cooking medium residue.

SUMMARY OF THE INVENTION

Thus, a need has arisen for a lifting lid supporting brace that is sufficiently strong to support a lifting lid mounted on a monorail lifting device. It is an advantage of this supporting brace that it permits the lifting lid assembly to employ an uncomplicated and compact structure of a monorail lifting device. It is a feature of the stream-lined monorail structure that it is easy to clean and easy to work around when loading unloading and cleaning the lifting lid. It also is a feature of this supporting brace that it is sufficiently strong to support the lifting lid on a monorail when the lifting lid is pivoted for inspection or cleaning or maintenance.

A further need has arisen for a lifting lid supporting brace that is sufficiently strong to support a lifting lid when the lifting lid falls from a vertically pivoted position to a horizontal position.

In addition, a need has arisen for a lifting lid supporting brace that is sufficiently strong to support a lifting lid including a food carrier apparatus. It is an advantage of this supporting brace that it permits the food carrier apparatus to carry increased amounts of food product.

In an embodiment of the invention, a supporting brace is used for pivotally mounting a fryer lifting lid on a monorail lifting device. The supporting brace comprises a U-shaped bracing member including a central bracing member and a first and a second bracing member extension. The central bracing member has a first member face and a second member face. A monorail mounting bracket is positioned on the second member face. A first transition portion extends from the first bracing member extension, and a second transition portion extends from the second bracing member extension. A first pivot arm extends from the first transition portion substantially perpendicular to the first member face, and a second pivot arm extends from the second transition portion substantially perpendicular to the second member face. The first bracing member extension has a first member extension height, and the second bracing member extension has a second member extension height. The first pivot arm has a first pivot arm height, and the second pivot arm has a second pivot arm height; such that the first member extension height is greater than the first pivot arm height, and the second member extension height is greater than the second pivot arm height. Moreover, the first transition portion is tapered between the first bracing member extension and the first pivot arm, and a second transition portion is tapered between the second bracing member extension and the second pivot arm.

In another embodiment of the invention, a supporting brace comprises a central bracing member having a first and a second member face and having a first and a second member end. A monorail mounting bracket is positioned on the second member face, and a first pivot arm and a second pivot arm extend substantially perpendicular to the first member face. A first reinforcing arm extends from the first member face and is in contact with the first pivot arm, and a second reinforcing arm extends from the first member face and is in contact with the second pivot arm.

In still another embodiment of the invention, a supporting brace comprises a central bracing member having a first and a second member face and having a first and a second member end. A monorail mounting bracket is positioned on the second member face. A first pivot arm extends substantially perpendicular to the first member face at the first member end, and a second pivot arm extends substantially perpendicular to the first member face at the second member end. The first member end has a first member end height, and the second member end has a second member end height. The first pivot arm has a first pivot arm height, and the second pivot arm has a second pivot arm height; such that the first member end height is greater than the first pivot arm height, and the second member end height is greater than the second pivot arm height. Moreover, a first reinforcing arm extends from the first member end and is in contact with the first pivot arm, and a second reinforcing arm extends from the second member end and is in contact with the second pivot arm.

In yet another embodiment of the invention, a lifting lid assembly comprises a lifting lid pivotally mounted on a supporting brace, a U-shaped bracing member, and a monorail lifting device. The U-shaped bracing member includes a central bracing member and a first and a second bracing member extension. The central bracing member has a first member face and a second member face. A monorail mounting bracket is positioned on the second member face. A first transition portion extends from the first bracing member extension, and a second transition portion extends from the second bracing member extension. A first pivot arm extends from the first transition portion and is substantially perpendicular to the first member face, and a second pivot arm extends from the second transition portion and is substantially perpendicular to the second member face. The first bracing member extension has a first member extension height, and the second bracing member extension has a second member extension height. The first pivot arm has a first pivot arm height, and the second pivot arm has a second pivot arm height; such that the first member extension height is greater than the first pivot arm height, and the second member extension height is greater than the second pivot arm height. Moreover, the first transition portion is tapered between the first bracing member extension and the first pivot arm, and a second transition portion is tapered between the second bracing member extension and the second pivot arm. The monorail lifting device comprises a monorail having a receiving bracket for receiving the monorail mounting bracket and a drive assembly, such as a counterbalance weight mounted in the monorail lifting lid housing, for raising and lowering the receiving bracket along the monorail.

In a further embodiment of the invention, a lifting lid assembly comprises a lifting lid pivotally mounted on a supporting brace, a supporting brace, and a monorail lifting device. The supporting brace comprises a central bracing member having a first and a second member face and having a first and a second member end. A monorail mounting bracket is positioned on the second member face, and a first pivot arm and a second pivot arm extend substantially perpendicular to the first member face. A first reinforcing arm extends from the first member face and is in contact with the first pivot arm, and a second reinforcing arm extends from the first member face and is in contact with the second pivot arm. The monorail lifting device comprises a monorail having a receiving bracket for receiving the monorail mounting bracket and a drive assembly, such as an assembly including a counterbalance weight, for raising and lowering the receiving bracket along the monorail.

In still a further embodiment of the invention, a lifting lid assembly comprises a supporting brace, a lifting lid pivotally mounted on the supporting brace, and a monorail lifting device. The supporting brace comprises a central bracing member having a first and a second member face and having a first and a second member end. A monorail mounting bracket is positioned on the second member face. A first pivot arm extends substantially perpendicular to the first member face at the first member end, and a second pivot arm extends substantially perpendicular to the first member face at the second member end. The first member end has a first member end height, and the second member end has a second member end height. The first pivot arm has a first pivot arm height, and the second pivot arm has a second pivot arm height; such that the first member end height is greater than the first pivot arm height, and the second member end height is greater than the second pivot arm height. Moreover, a first reinforcing arm extends from the first member end and is in contact with the first pivot arm, and a second reinforcing arm extends from the second member end and is in contact with the second pivot arm. The monorail lifting device comprises a monorail having a receiving bracket for receiving the monorail mounting bracket and a drive assembly, such as a manual, automatic, or manually assisted mechanism, for raising and lowering the receiving bracket along the monorail.

Other objects, features, and advantages will be apparent to persons of ordinary skill in the art in view of the following detailed description of preferred embodiments and the accompanying drawings.

DESCRIPTION OF THE DRAWINGS

For a more complete understanding of the present invention, the needs satisfied thereby, and the features and advantages thereof, reference now is made to the following descriptions taken in connection with the accompanying drawings in which.

DETAILED DESCRIPTION OF PREFERRED EMBODIMENTS

Figure 1:
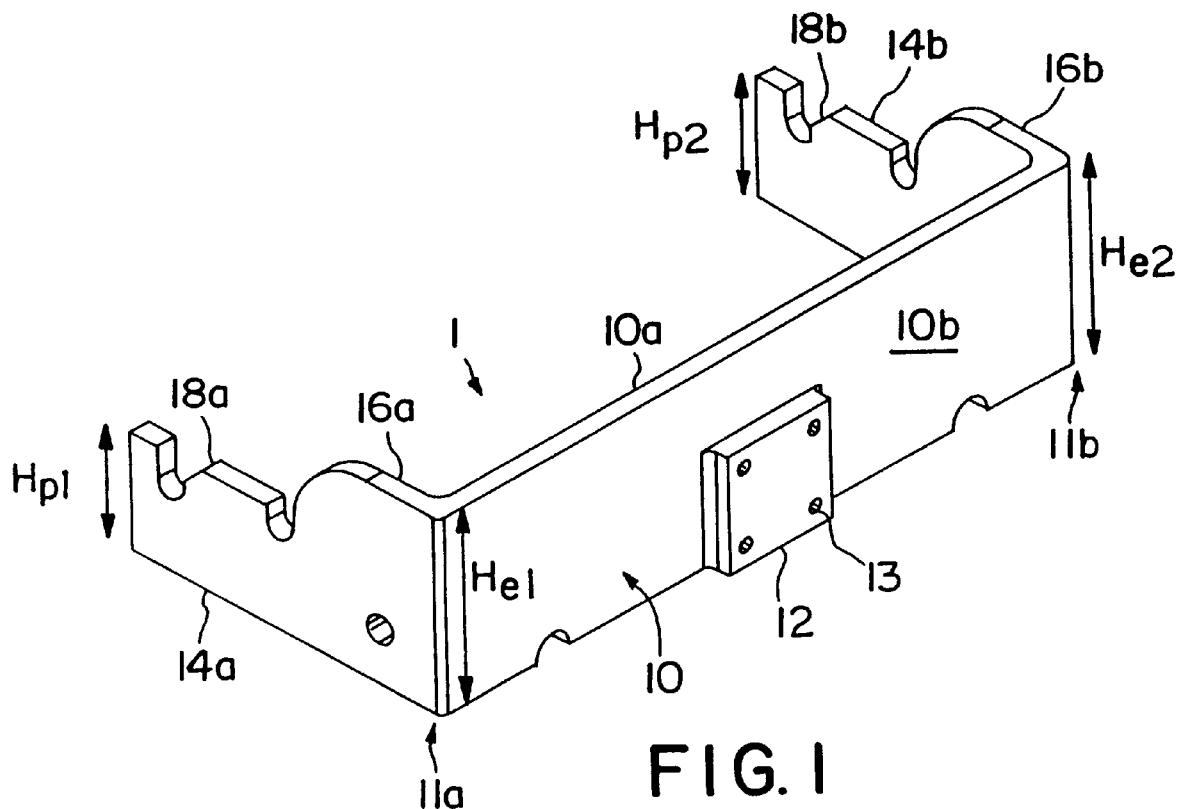
FIG. 1 is a perspective view of a supporting brace for pivotally mounting a fryer lifting lid on a monorail lifting device.
Figure 4:
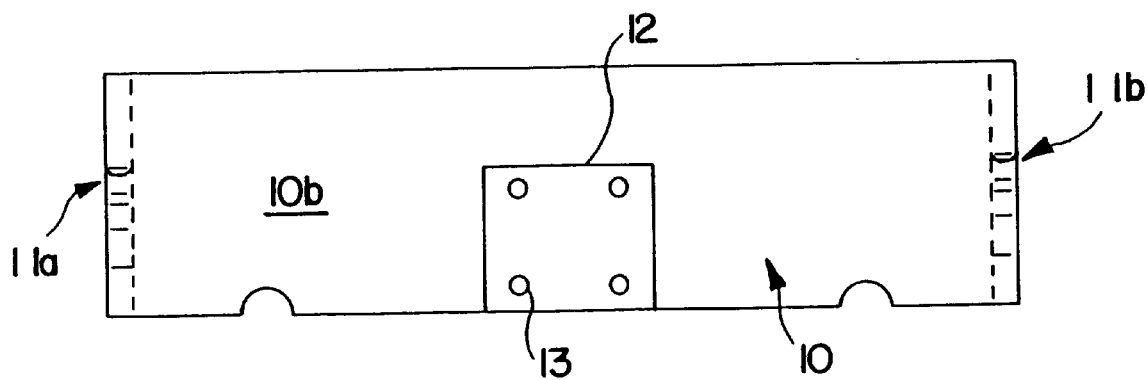
FIG. 4 is a rear view of a supporting brace of FIG. 1.

Referring to FIG. 1, a perspective view of a supporting brace 1 is depicted. Supporting brace 1 comprises a central bracing member 10 having a first member face 10a and a second member face 10b and a first member end 11a and a second member end 11b. Referring to FIGS. 1 and 4, a monorail mounting bracket 12 is positioned on second member face 10b and is equipped with a plurality of monorail mounting connector apertures 13. Apertures 13 may receive connector means (not shown), such as screws, bolts, and the like, to connect supporting brace 1 to a U-shaped receiving bracket (not shown) having a corresponding number of bracket apertures (not shown).

Figure 3:
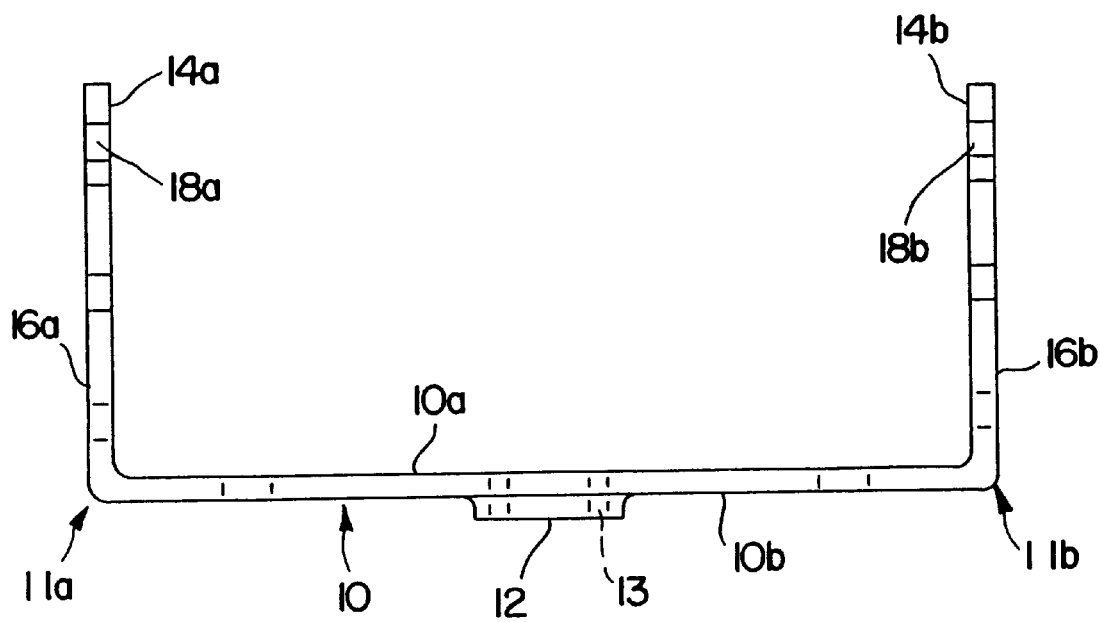
FIG. 3 is an overhead view of the supporting brace of FIG. 1.

Referring to FIGS. 1 and 3, a first pivot arm 14a and a second pivot arm 14b extend from first member end 11a and second member end 11b, respectively, and are substantially perpendicular to first member face 10a of central bracing member 10. First member end 11a has a first member end height $H_{e1}$, and second member end 11b has a member end height $H_{e2}$. First pivot arm 14a has a first pivot art height $H_{p1}$, and second pivot arm 14b has a second pivot arm height $H_{p2}$. First member end height $H_{e1}$ is greater than first pivot arm height $H_{p1}$, e.g., first pivot arm height $H_{p1}$ is about 60% of first member end height $H_{e1}$. Second member end height $H_{e2}$ is greater than second pivot arm height $H_{p2}$, e.g., second pivot arm height $H_{p2}$ is about 60% of second member end height $H_{e2}$. For example, $H_{p1}$ and $H_{p2}$ may each be about three (3) inches (7.62 cm), and $H_{e1}$ and $H_{e2}$ may each be about five (5) inches (12.7 cm).

Figure 2:
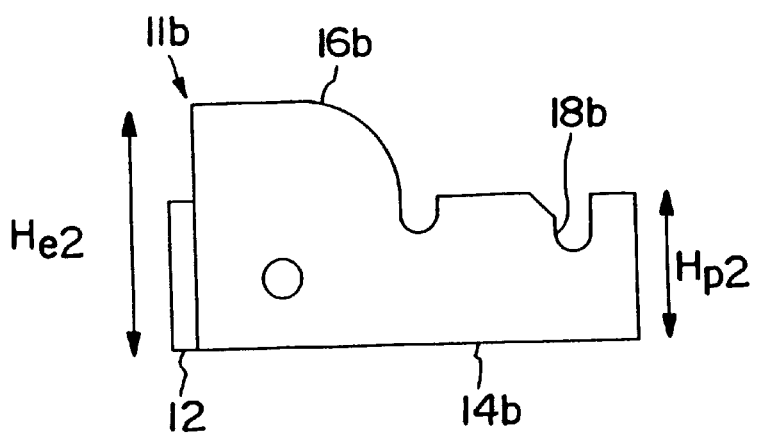
FIG. 2 is a side view of the supporting brace of FIG. 1.

Referring to FIG. 2, a second reinforcing arm 16b extends from second member end 11b of central bracing member 10 and extends along and contacts second pivot arm 14b for at least a portion of its length, eg., less than about one half of its length. Similarly, a first reinforcing arm 16a extends from first member end 11a of central bracing member 10 and extends along and contacts first pivot arm 14a for at least a portion of its length. Supporting brace 1 may be manufactured from metal, ceramic, composite, or other similarly strong and rigid material. Preferably, supporting brace 1 is made from an aluminum alloy, such as an aluminum alloy with an Aluminum Association Designation No. 356. Further, it is preferred that the aluminum alloy has a temper designation of about T6.

Figure 5:
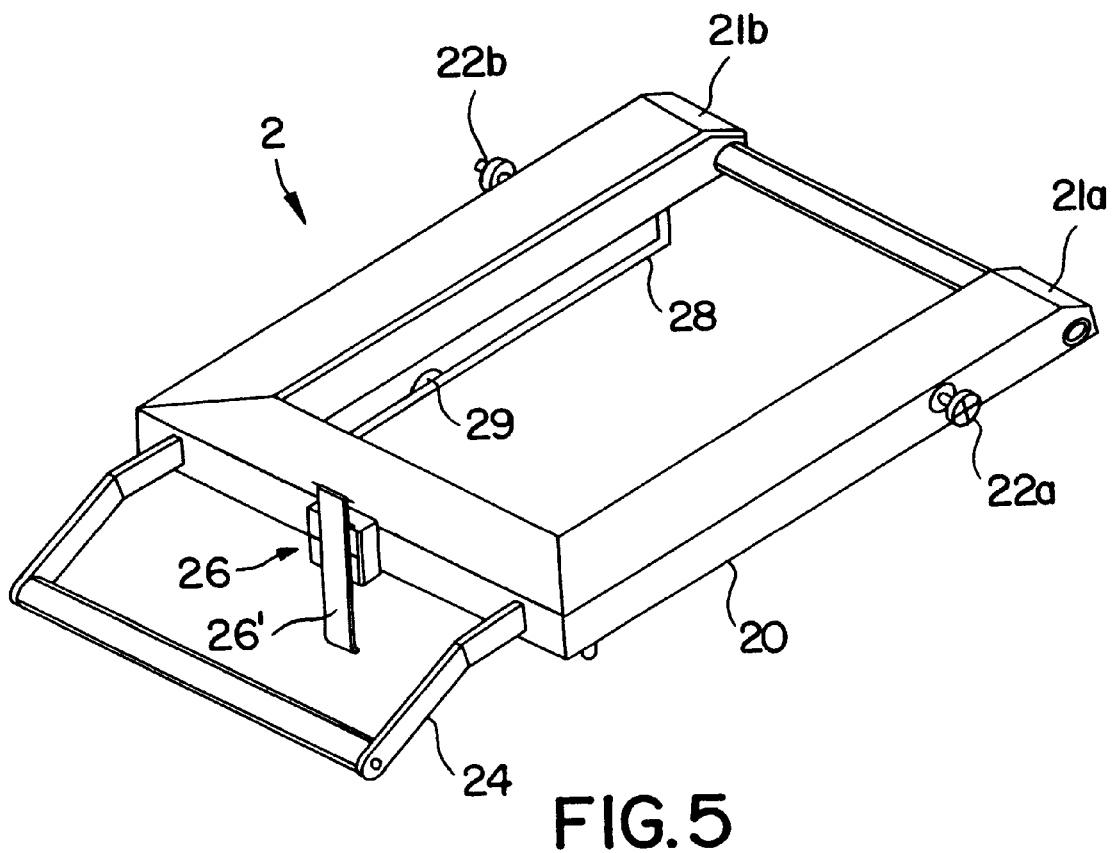
FIG. 5 is a perspective view of a lifting lid for an open-well fryer.
Figure 6:
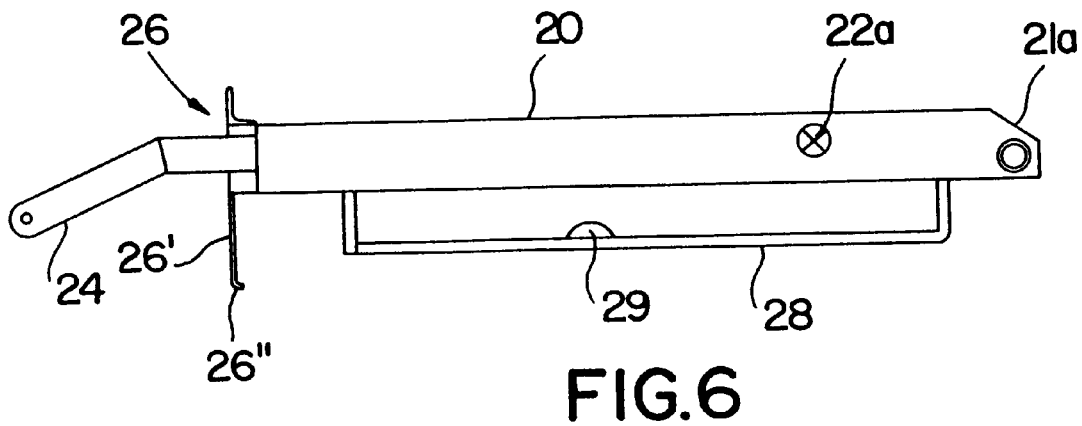
FIG. 6 is a side view of the lifting lid of FIG. 5.

Referring to FIGS. 5 and 6, a lifting lid 2 for an open well cooker is depicted. Lifting lid 2 comprises a substantially rectangular frame 20. Frame 20 has a first frame pivot cutout 21a and a second frame pivot cutout 21b, which are formed on a portion of frame 20 adjacent to supporting brace 1 in locations that generally correspond in proximity to first member end 11a and second member 11b, respectively. Frame 20 also has a pair of pivot rods 22a and 22b, which are adapted to be received by a first lid pivot bracket 18a and a second lid pivot bracket 18b, respectively, as depicted in FIG. 1.

Frame 20 further comprises a handle 24, by which an operator may manually raise or lower or may assist a motor in raising or lowering lifting lid 2 and by which lifting lid 2 may be pivoted on pivot rods 22a and 22b for inspection, cleaning, or maintenance. Moreover, frame 20 includes a lifting lid latch 26. Lifting lid latch 26 may include a vertically oriented piece of sheet metal 26' having a hooked portion 26" for engaging a horizontally oriented piece of sheet metal (not shown). Thus, in this embodiment, lifting latch 26 may be disengaged by pulling hooked portion 26" away from the horizontally oriented piece of sheet metal.

Figure 7:
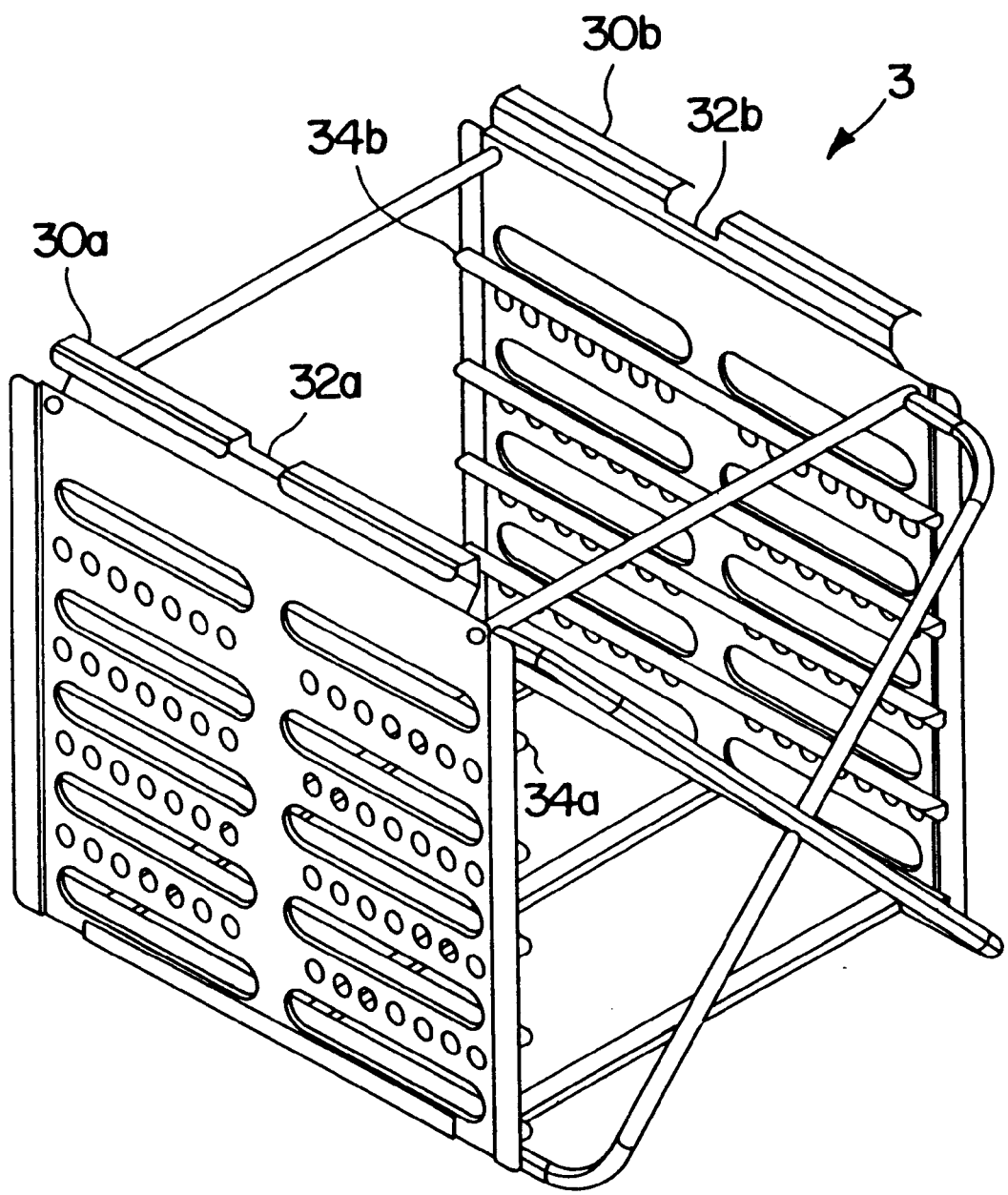
FIG. 7 is a perspective view of a food carrier apparatus, which may be suspended beneath a lifting lid.

Lifting lid 2 further comprises a removably mounted food carrier apparatus, such as that depicted in FIG. 7, which is suspended beneath lifting lid 2. The food carrier apparatus may be: a wire basket, such as those used to cook french fries in many restaurants; a tray carrier having a plurality of slots, each for receiving a food product carrier trays; or the like. Food product carrier trays may be wire baskets or may be fabricated from sheet metal and may include a plurality of openings which permit a cooking medium to flow through the tray. Frame 20 includes a pair of supporting rails 28. Supporting rails 28 are parallel to each other and extend longitudinally beneath frame 20. Moreover, rails 28 are oriented substantially perpendicular to first member face 10a of central bracing member 10.

Referring to FIG. 7, a food carrier apparatus 3 is depicted which has a pair of opposing carrier tray arms 30a and 30b. Carrier tray arms 30a and 30b are adapted to engage supporting rails 28 which extend beneath frame 20. Referring to FIGS. 5 and 6, a food carrier apparatus stop 29 is formed on each of supporting rail 28. Food carrier apparatus stop 29 is adapted to secure food carrier apparatus 3 on rails 28 of lifting lid 2. A carrier stop receiving gap 32a is formed in carrier tray arm 30a, and a carrier stop receiving gap 32b is formed in carrier tray arm 30b, to receive one of food carrier apparatus stops 29 from rails 28.

Referring again to FIG. 7, food carrier apparatus 3 has a plurality of pairs of food tray support brackets 34a and 34b. Food tray support brackets 34a and 34b are adapted to receive a plurality of food product carrier trays. As noted above, these food product carrier trays may be wire baskets or sheet metal trays including a plurality of openings which permit a cooking medium to flow through such trays, or the like.

Figure 8A:
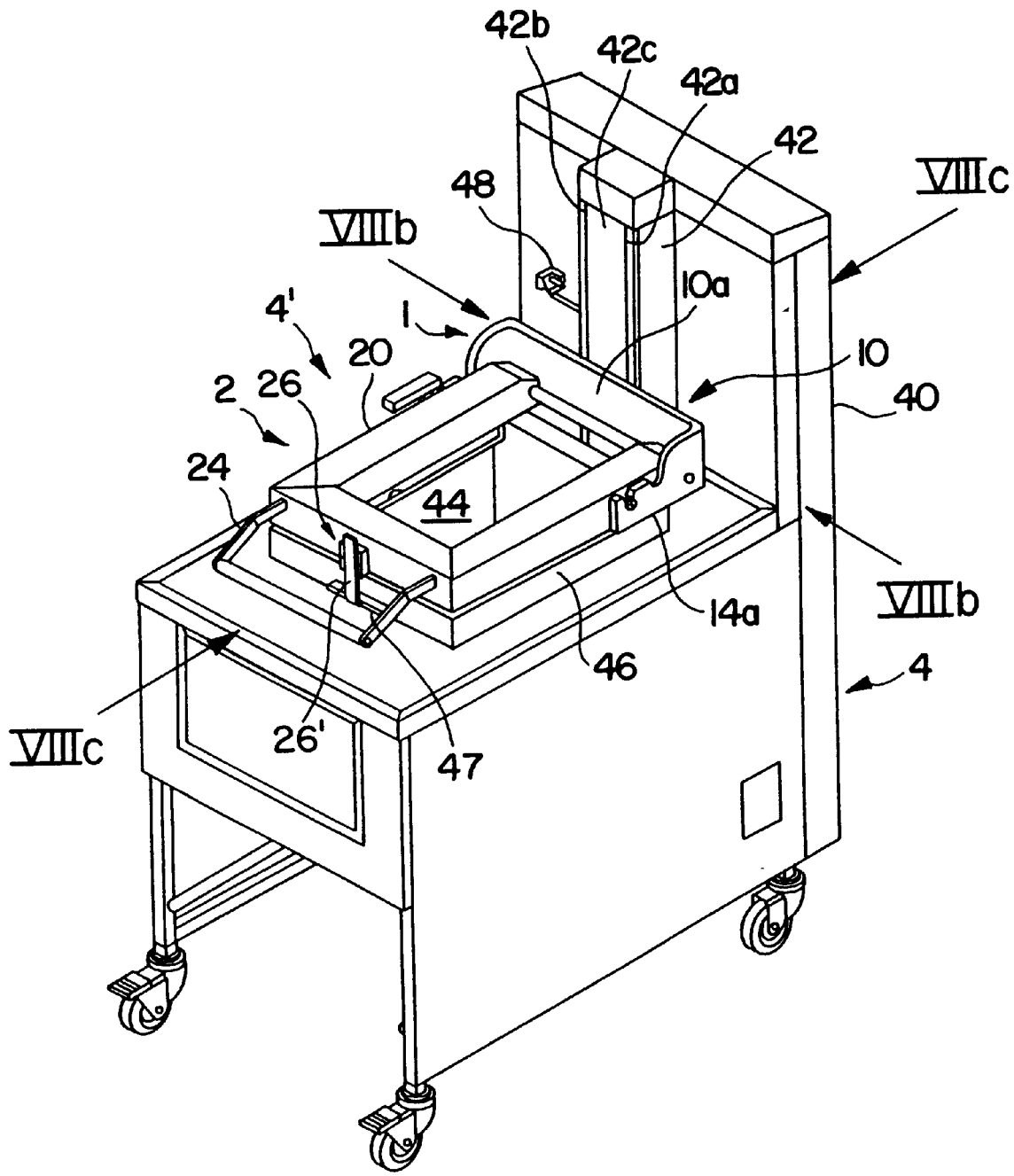
FIG. 8a is a perspective view of a fryer transfer cart with the lifting lid of FIG. 5 mounted on is a monorail by means of the supporting brace of FIG. 1.
Figure 8B:
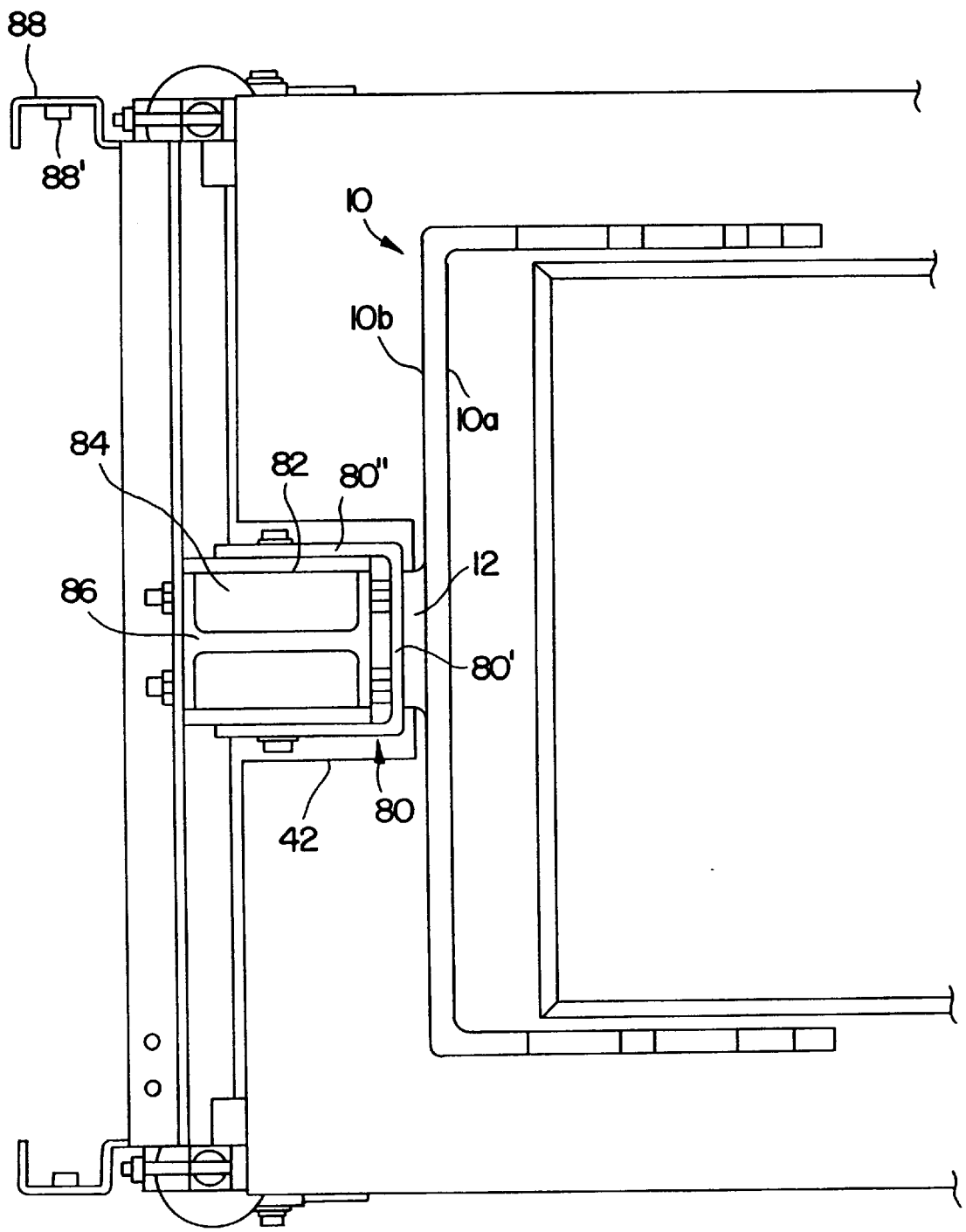
FIG. 8b is an enlarged, partial cross-sectional view of the fryer transfer cart of FIG. 8a along Line VIIIb—VIIIb.

Referring to FIG. 8a, a fryer transfer cart 4 includes a monorail lifting device housing 40. Lifting lid 2 of FIG. 5 is pivotally mounted on supporting brace 1 of FIG. 1. Lifting lid 2 and supporting brace 1 are mounted by means of a U-shaped receiving bracket (not shown) on a monorail 42 which extends from monorail lifting device housing 40. Monorail 42 includes a first monorail wear strip 42a and a second monorail wear strip 42b. Wear strips 42a and 42b may be fabricated from plastics, ceramics, Teflon® coated metal, or the like and prevent damage to monorail 42 and supporting brace 1 due to abrasion between supporting brace 1 and monorail 42. Referring to FIG. 8b, an enlarged, partial cross-sectional view of fryer transfer cart 4 of FIG. 8a is depicted along Line VIIIb—VIIIb. Monorail 42 has a central opening 42c in which a U-shaped receiving bracket 80 may be inserted. U-shaped receiving bracket 80 moves within central opening 42c as lifting lid 2 and supporting brace 1 are raised and lowered. Further, sheets of plastic or metal may be slidably mounted within central opening 42c, above and below the receiving bracket, such that central opening 42c may remain sealed despite the movement of lifting lid 2 and supporting brace 1. These protective sheets prevent dust, dirt, and cooking medium residue from interfering with the raising and lowering of lifting lid 2 and supporting brace 1.

Referring again to FIG. 8b, a central portion 80' of the receiving bracket 80 is secured to monorail mounting bracket 12 of FIG. 1, such that two, substantially parallel guide arms 80" of the receiving bracket 80 extend away from and substantially perpendicular to second member face 10b of central bracing member 10. Substantially parallel guide arms 80" extend into central opening 42c and are mounted on a carriage 82 having a plurality of pairs of wheels 84. Wheels 84 are received by and move within a vertically oriented I-beam 86. Receiving bracket 80 thus is movable within central opening 42c.

Figure 8C:
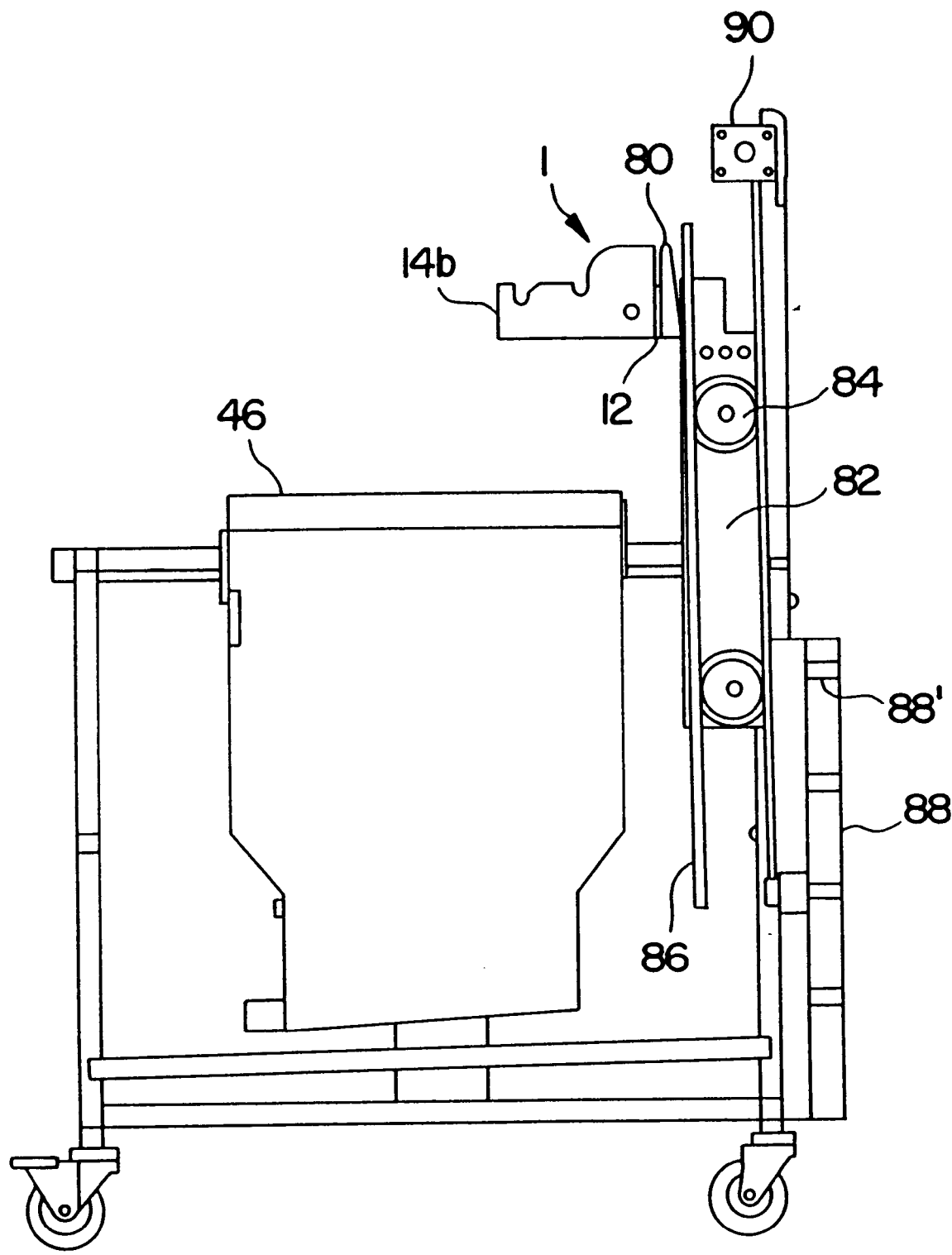
FIG. 8c is a cross-sectional view of the fryer transfer cart of FIG. 8a along Line VIIIc—VIIIc.

FIG. 8c is a cross-sectional view of fryer transfer cart 4 of FIG. 8a along Line VIIIc—VIIIc. In FIG. 8c, carriage 82 having two pairs of wheels 84 is shown within I-beam 86. In addition, a pulley or drum may be mounted on a pulley bracket 90. A cable or a plurality of cables may be threaded through the pulley or across the drum and attached to carriage 82 to raise or lower receiving bracket 80 and supporting brace 1. The pulley or drum mounted on pulley bracket 90 may be driven by a motor, e.g., an electric motor.

Lifting lid 2 and supporting brace 1 mounted on monorail 42 form a lifting lid assembly 4'. Lifting lid 2 is positioned over the open well of a cooking vessel 44 and is seated on an upper edge 46 of cooking vessel 44. In a pressure cooker or pressure fired fryer, lifting lid 2 comprises a solid, substantially rectangular lid (not shown) having a gasket (not shown) for forming an air-tight seal with upper edge 46 of cooking vessel 44. Such a lifting lid for a pressure cooker or pressure fired fryer is described in U.S. Pat. Nos. Des. 336,007 and 4,930,408, the disclosures of which are incorporated herein by reference. As described above with respect to FIGS. 5 and 6, lifting lid latch 26 may include vertically oriented piece of sheet metal 26' having hooked portion 26". Referring again to FIG. 8a, vertically oriented piece of sheet metal 26' may engage a horizontally oriented piece of sheet metal 47. Thus, in this embodiment, lifting latch 26 may be disengaged by pulling vertically oriented piece of sheet metal 26' away from horizontally oriented piece of sheet metal 47.

Figure 9:
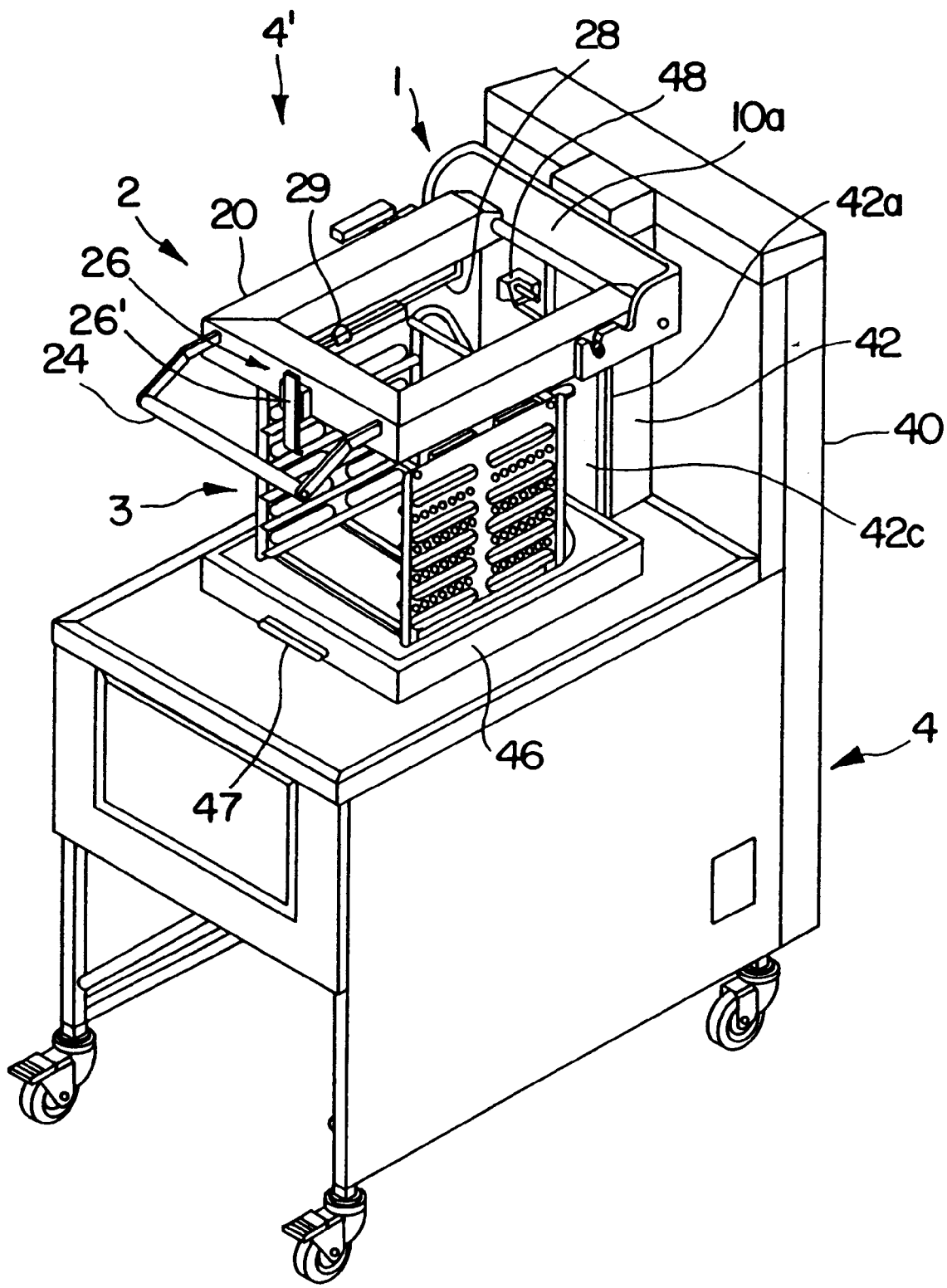
FIG. 9 is a perspective view of the fryer transfer cart of FIG. 8a showing the lifting lid in the raised position with the food carrier apparatus of FIG. 7 suspended beneath the lifting lid.

An operator may use handle 24 to manually raise and lower lifting lid 2 or to manually assist a motor in raising or lowering lifting lid 2 along monorail 42 or pivot lifting lid 2 vertically on supporting brace 1. Lifting lid 2 may be manually raised or lowered and supported in a raised position by a lid locking mechanism 48. Referring to FIG. 9, fryer transfer cart 4 of FIG. 8a is depicted with lifting lid 2 in a raised position. Food carrier apparatus 3 of FIG. 7 also is depicted suspended beneath lifting lid 2. As noted above, food carrier apparatus 3 has a plurality of pairs of food tray support brackets 34a and 34b, and food tray support brackets 34a and 34b are adapted to receive a plurality of food product carrier trays. Thus, by raising or lowering lifting lid 2, food carrier apparatus 3 may be removed from or submerged in a cooking medium in cooking vessel 44.

Lifting lid assembly 4' of FIGS. 8a–c and 9 may include a manual, automatic, or manually assisted driving assembly. For example, referring again to FIGS. 8b and 8c, a manual driving assembly may include a counterbalance weight which weighs less than lifting lid 2, supporting brace 1, and a food carrier apparatus, such as that depicted in FIG. 8c, carrying an average quantity of food. The counterbalance weight may be joined to the receiving bracket by means of at least a pair of cables and at least one pulley. The counterbalance weight may move within a counterbalance guide 88. Counterbalance guide 88 may be equipped with a plurality of braking tabs 88', such that if one of the cables fails the counterbalance weight will fall against and be caught by at least one of braking tabs 88'. In addition, an electric motor may engage and drive the pulley in a manually assisted configuration of the driving assembly. The operators lifting of handle 24 is thus sufficient to raise lifting lid 2, supporting brace 1, and a food carrier apparatus. Lifting lid 2 may then be positioned at various heights by means of a lid locking mechanism 48 depicted in FIGS. 8a and 9.

Alternatively, the driving assembly may include a carriage mounted within a framework housed within monorail 42. A motor (not shown), eg., an electric motor, is attached to the carriage by raising means (not shown). Substantially parallel guide arms 80" of the receiving bracket 80 extend into central opening 42c and are secured to the carriage. In one embodiment of lid lifting assembly 4', the raising means may include at least one cable and a cable drum (not shown) driven by the motor. A cable (not shown) is attached to the cable drum and carriage 82, such that the motor is operable in opposite directions to wind and unwind the cable on the cable drum to raise and lower the carriage. A similar configuration employing two widely separated vertical slots and a correspondingly wide framework and carriage is described in detail in U.S. Pat. No. 5,402,712, the disclosure of which is incorporated herein by reference. In yet another configuration, the raising means may comprise a screw drive (not shown) driven by the motor and a jacking gear (not shown) attached to the carriage. The jacking gear may be engaged by the screw drive, such that the motor is operable in opposite directions to drive the screw drive to raise and lower the carriage-mounted lifting lid assembly.

While the invention has been described in connection with preferred embodiments, it will be understood by those skilled in the art that other variations and modifications of the preferred embodiments described above may be made without departing from the scope of the invention. Other embodiments will be apparent to those skilled in the art from a consideration of the specification or practice of the invention disclosed herein. It is intended that the specification is considered as exemplary only, with the true scope and spirit of the invention being indicated by the following claims.

What is claimed is:

1. A supporting brace for pivotally mounting a fryer lifting lid on a monorail lifting device, comprising:
   a U-shaped bracing member including a central bracing member and a first and a second bracing member extension, said central bracing member having a first member face and a second member face;
   a monorail mounting bracket positioned on said second member face;
   a first transition portion extending from said first bracing member extension and a second transition portion extending from said second bracing member extension;
   a first pivot arm extending from said first transition portion substantially perpendicular to said first member face; and
   a second pivot arm extending from said second transition portion and substantially perpendicular to said second member face;
   wherein said first bracing member extension has a first member extension height and said second bracing member extension has a second member extension height;
   wherein said first pivot arm has a first pivot arm height and said second pivot arm has a second pivot arm height, such that said first member extension height is greater than said first pivot arm height and said second member extension height is greater than said second pivot arm height; and
   wherein said first transition portion is tapered between said first bracing member extension and said first pivot arm and a second transition portion is tapered between said second bracing member extension and said second pivot arm.

2. A supporting brace for pivotally mounting a fryer lifting lid on a monorail lifting device, comprising:
   a central bracing member having a first and a second member face and having a first and a second member end;
   a monorail mounting bracket positioned on said second member face; and
   a first pivot arm and a second pivot arm extending substantially perpendicular to said first member face;
   wherein a first reinforcing arm extends from said first member face and is in contact with said first pivot arm and a second reinforcing arm extends from said first member face and is in contact with said second pivot arm.

3. A supporting brace for pivotally mounting a fryer lifting lid on a monorail lifting device, comprising:
   a central bracing member having a first and a second member face and having a first and a second member end;
   a monorail mounting bracket positioned on said second member face;
   a first pivot arm extending substantially perpendicular to said first member face at said first member end; and
   a second pivot arm extending substantially perpendicular to said first member face at said second member end;
   wherein said first member end has a first member end height and said second member end has a second member end height;
   wherein said first pivot arm has a first pivot arm height and said second pivot arm has a second pivot arm height, such that said first member end height is greater than said first pivot arm height and said second member end height is greater than said second pivot arm height; and
   wherein a first reinforcing arm extends from said first member end and is in contact with said first pivot arm and a second reinforcing arm extends from said second member end and is in contact with said second pivot arm.

4. The supporting brace of claim 3, wherein said first pivot arm height is about 60 percent of said first member end height.

5. The supporting brace of claim 3, wherein said second pivot arm height is about 60 percent of said second member end height.

6. The supporting brace of claim 3, wherein each of said first and said second pivot arms includes a lid pivot bracket.

7. The supporting brace of claim 3, wherein said supporting brace is made from an aluminum alloy.

8. The supporting brace of claim 7, wherein said aluminum alloy is an aluminum alloy with Aluminum Association Designation No. 356.

9. The supporting brace of claim 7, wherein said aluminum alloy has a temper designation of about T6.

* * * * *